United States Patent Office 3,497,492
Patented Feb. 24, 1970

3,497,492
PREPARATION OF PLACENTAL ALBUMIN
Francis Fremonte Buck, Suffern, N.Y., Merle Vernon Querry, Westwood, N.J., William Frederic Barg, Jr., Monsey, N.Y., and Americo Valentine Gianonatti, Park Ridge, N.J., assignors to American Cyanamid Company, Stamford, Conn., a corporation of Maine
No Drawing. Filed Apr. 2, 1968, Ser. No. 718,191
Int. Cl. C07g 7/00
U.S. Cl. 260—122                                 8 Claims

ABSTRACT OF THE DISCLOSURE

Albumin is recovered from human placental material by a series of fractionation procedures employing specific alcoholic concentrations, ionic concentrations, pH values, and temperature limitations to vary the solubility of the albumin with respect to the other constituents of the placental material. Each fractionation step is made under different pH, temperature, and alcohol concentration conditions. A suitable starting material for the process is the supernatant resulting from the two-step process of (1) extracting placental material with an aqueous saline solution, and (2) treating the extract with methanol to precipitate beta and gamma globulins. Each fractionation step of the process removes one or more impurities from the starting material to yield a highly purified albumin product.

---

This invention relates to a process for obtaining albumin from human placentas. More particularly, it relates to the separation of purified albumin from human placental material by a series of fractionations.

Placentas are a convenient and inexpensive source of human blood and tissue products including serum globulins and albumin. There is an increasing demand both for serum globulins for immunization against measles, poliomyelitis and other diseases, and for albumin as a plasma substitute. Pracental plasma is approximately equivalent to normal human plasma in composition, making it a highly desirable source of both globulins and albumin. Because of the substantial demand for both serum globulins and albumin, it is desirable in processing placental material to use isolation techniques which allow recovery of these materials in useful form.

It has recently been discovered that purified albumin from human placental material is an effective expander for Rh typing serums. Copending application Ser. No. 541,125, now abandoned, of Querry and Barnum, filed Apr. 8, 1966, and assigned to the assignee of this application, discloses the utility of placental albumin as such an expander and illustrates one method for recovering purified placental albumin from human placentas.

The purifiication process there described involves the extraction of beta and gamma globulins from the placental material and the further processing of the placental residue. This residue is an inexpensive source of albumin, since it represents a normally wasted by-product from the globulin recovery. The present invention represents an improvement over the process disclosed in that prior, copending application.

In the past, the separation of albumin from protein and other components of human blood has been accomplished by control of the relative solubilities of the various components of the blood. In practice, solution variables such as alcohol concentration, temperature, salt concentration, and pH have been varied so that the protein to be separated has (1) a high solubility when most other components of the system have low solubilities, or (2) a low solubility when most of the components of the system have a high solubility.

Sharp single step separations based on solubility differentials between albumin and the other proteins in blood have proved to be difficult or impossible. The large number of components in blood compositions and the similarity of their physical and chemical properties have generally resulted in imperfect separations. Further, the similar physical and chemical properties of the blood proteins have generally caused albumin separation processes to be complex and lengthy. These long, complex, separation techniques, together with the inherent problems resulting from the similar physical and chemical properties of the various blood proteins have resulted in the achievement of undesirably low yields of albumin from placental material.

Because of these problems, a continuing search goes on for simpler and more effective albumin separation processes.

It is therefore a primary object of the present invention to provide an improved process for the separation of purified albumin materials from human placental material.

Another object of this invention is to provide an improved process for producing purified albumin materials from human placental source materials, which involves a minimum of manipulative operations.

Still another object of this invention is to provide an improved process for the production from human placental material of purified albumin which can be used for blood typing purposes.

Yet another object of the invention is to provide an improved process for producing a high yield of purified albumin from human placental material.

Another object of this invention is to provide an improved process for producing a high yield of purified albumin suitable for use as a blood expander.

Additional objects and advantages of the invention will be set forth in part in the description which follows, and in part will be obvious from the description, or may be learned by practice of the invention, the objects and advantages being realized and attained by means of the methods, processes, improvements and combinations of steps particularly pointed out in the appended claims.

To achieve the foregoing objects and in accordance with its purpose, this invention, as embodied and broadly described, includes a process for separating albumin material from a starting methanolic solution of placental material which is substantially free of beta and gamma globulins. A first fractionation step is performed by adding a water-soluble caprylate salt, or the free acid, to the solution of placental material to make the solution 0.01 to 0.05 molar with respect to caprylate ions, adjusting the pH of the solution to 4.7 to 6.0, cooling the resulting solution to a temperature of from 0 to 20° C. and accumulating a precipitate of waste solids. The solids from this first fractionation step are discarded and the albumin-containing fluid is subjected to a second fractionation step wherein albumin is precipitated by adding methanol to increase the methanol concentration to a level that will cause precipitation of substantially all of the albumin in the albumin-containing fluid.

A third fractionation step is carried out by dissolving the precipitated albumin in water at a pH of about 1-3, agitating the resulting mixture to insure dissolution of the albumin, adding bentonite (colloidal hydrated aluminum silicate) to a concentration of 0.5%, centrifuging and filtering the solution to recover fluid albumin in the filtrate. The pH of the filtrate is adjusted to 4.7 to 5 and it is then refiltered. Subsequently, the methanol concentration of the final filtrate from the third fractionation step is increased to precipitate an albumin product. This precipitated product contains a highly purified albumin, which can be suspended in water and freeze-dried for storage, if desired.

The invention lies in the novel methods, processes, and improvements shown and described. It is to be understood that both the foregoing general description and the following detailed description are exemplary and explanatory but are not restrictive of the invention.

The process of this invention allows the preparation of purified albumin material which can be used for blood typing, or as a blood expander. The purified placental albumin produced by the present process is substantially free of all the globulins (alpha, beta, and gamma), hemoglobin and other interfering proteins, but it is not 100% albumin.

The starting material used in the process of the present invention is prepared by extraction of placental material with an aqueous saline solution. The placentas are preferably comminuted before addition of the salt solution. After the placental material is contacted with the saline solution for about one to two hours, the saline solution containing dissolved proteins is separated from the placental tissue. Methanol is then added to the saline solution to precipitate beta and gamma globulins and produce the starting material of the present process.

A convenient starting material for this process is the so-called "supernatant human albumin" which is a by-product from the production of globulins by extraction of placentas with aqueous saline solution and subsequent addition of methanol to achieve a 16.7 to 25% by volume methanol solution and thereby achieve precipitation of the beta and gamma globulins from the solution. A 25% methanol solution is a preferred starting material. After separating the globulin precipitate from the liquid portion by centrifugation, the supernatant contains, among other blood elements, a major portion of the blood albumin. It does not contain substantial amounts of beta or gamma globulins.

Centrifugation and filtration are the principal means for separating precipitates from the fluid supernatant during each of the fractionation steps of the process of this invention. When large volumes of solution are to be processed, continuous centrifugation is preferred, and therefore centrifugation is the preferred means for accomplishing the separations of the first and second fractionation steps of the present process. Filtration is a preferred method for recovering small amounts of suspended solids. It should be noted, however, that the particular mode used to effect physical separation does not constitute a critical aspect of this invention.

In accordance with the invention, waste solids are precipitated from the starting methanolic, albumin-containing solution during a first fractionation step. These waste solids are precipitated by holding the starting methanolic solution at 10 to 25° C. and adding a sufficient amount of a water-soluble salt of caprylic acid to produce a 0.01 to 0.05 molar solution of caprylate ions. The pH of the resulting mixture is then adjusted to from about 4.7 to about 6.0 and the mixture is allowed to stand at 20 to 25° C. for up to about 2 hours.

In a preferred embodiment of the present process, sodium caprylate is added to 25% methanolic starting material at 20 to 25° C. to achieve a 0.025 molar concentration of caprylate ions. The pH of the resulting mixture is adjusted to 4.8 and the mixture is allowed to stand at 20 to 25° C. for 15 to 30 minutes.

The pH-adjusted methanolic solution is then cooled to 0 to 20° C. (preferably 0 to 5° C.) and allowed to stand from about 5 to 20 hours at that temperature. A standing time of about 16 hours is preferred. The resulting mixture is then centrifuged or filtered at 0 to 20° C. and the solids separated by this procedure are discarded. The solids removed in this first fractionation step include the bulk of the hemoglobin and globulins present in the starting material.

During the selective precipitation of proteins in the first fractionation step, the methanolic solution should be from 0.01 to 0.05 molar with respect to caprylate ions. A caprylate ion concentration of about 0.025 is preferred.

The use of a methanolic solution and the specified concentration of caprylate ions in the present process permits the use of relatively low temperatures for the highly selective precipitation of the hemoglobin and globulins. The upper temperature limit during the first fractionation step is about 25° C. At lower solution temperatures, below about 2° C., an excessive quantity of albumin is precipitated and lost with the waste solids.

The second fractionation step of the present process includes addition of methanol to the fluid supernatant from the first fractionation step to produce a methanol concentration of about 40 to 50% by volume of 100% methanol. A 50% methanol concentration is preferred. The addition of these quantities of methanol precipitates the albumin in the supernatant solution from the first fractionation step, while leaving impurities including hemoglobin, $\alpha$-globulins and nucleotides in solution. Preferably the solution is held at −5 to −8° C. for from 2 to 20 hours to accumulate the precipitated albumin. The precipitated solids are separated from the alcoholic solution, for example by centrifugation, and the supernatant from this second fractionation step is discarded.

In the third fractionation step of the present process, the solids residue from the second fractionation step is treated to prepare an intermediate albumin solution and to thereby separate the albumin from the waste solids present in the residue. Subsequently, the pH of the intermediate albumin solution is adjusted to precipitate impurities and produce a final alubumin solution.

More specifically, in the third fractionation step of the process the solids residue from the second fractionation step, which contains the albumin component is dissolved in water, the pH adjusted to about 1 to 3. Bentonite is added to 0.5% concentration. The solution, containing the solids residue, is preferably maintained at a pH of from 2 to 3. This low pH allows effective dissolution of albumin and its separation from most of the remaining solids residue of the second fractionation step. The solids residue is believed to be largely hemoglobin or its decomposition products.

The resulting mixture is agitated, preferably by stirring, for about 2 to 4 hours at 0 to 5° C.) preferably 2° C.). This stirring is following by centrifugation and filtration, which is preferably carried out by successively passing the solution through a first D–0 filter pad and then through a second K–8 filter pad to produce the intermediate albumin solution. The solids component separated in these filtration operations is discarded.

The intermediate albumin-containing solution is then adjusted to a pH of about 4.7 to 5. Adjustment of the pH to about 4.8 and a holding time of 1 to 2 hours at 0 to 4° C. are preferred conditions for accumulating the precipitate.

In a final separation step of the present process, the methanol content of the final albumin solution from the third fractionation step is re-established at a level that will precipitate substantially all of the albumin in solution. Generally, methanol concentrations of 40 to 50%, by volume may be used and a centration of about 50% is preferred. The mixture is held for 2 to 20 hours at about −5 to −8° C. and then centrifuged and the supernatant discarded.

The precipitate produced by the addition of methanol to the final filtrate from the third fractionation step represents the improved albumin product of this invention. It is advantageous in accordance with this process to suspended the solid albumin product in water, at a pH of about 6.4 to 7.2 and preferably at a pH of about 6.8, and to subsequently freeze-dry the solid product.

The resulting albumin product is substantially free from alpha, beta, and gamma globulins, hemoglobin, and other interfering proteins. The product contains from 97 to almost 100% albumin. A 40% or better recovery of the albumin originally available from human placenta material is possible by use of the process of this invention. The albumin product produced by the present process can be used satisfactorily as an expander for typing of blood including extended Rh typing serums and as a blood expander.

For a clearer understanding of the invention, specific examples of it are set forth below. These examples are merely illustrative and are not intended to limit the scope and underlying principles of the invention in any way.

EXAMPLE 1

A one liter sample of 25% methanolic supernatant from the production of gamma globulin (human placental origin), is made 0.025 molar with respect to caprylate ions, through the addition of sodium caprylate at 20 to 25° C. The pH of the solution is adjusted to 4.8 by the addition of 4 N hydrochloric acid, and the solution is stirred for 30 minutes. The resulting suspension is cooled at 4° C., allowed to stand for 16 hours, and then clarified by centrifugation at 12000× gravity. The precipitate from this first fractionation step, containing the bulk of hemoglobin and globulins present in the starting material, is discarded.

The supernatant from the first fractionation step is then filtered with D-0 and K-8 filter pads, and cooled to −5° C. Its methanol content is adjusted to 50% by volume and the resulting mixture is allowed to stand at −5° C. for 16 hours. The precipitate from this second fractionation step is collected by centrifugation.

The precipitate from the second fractionation step is mixed with 200 ml. of water. The pH of the mixture is adjusted to 2.0 with 1 N hydrochloric acid, bentonite was added to a concentration of 0.5%, and the mixture is stirred at 2° C. for 1 hour. The mixture is then centrifuged and filtered successively through D-0 and K-8 filter pads to form an intermediate albumin solution. The solids collected by this filtration operation are discarded. The filtrate is adjusted to pH 4.8 with 1 N sodium hydroxide, to obtain a final albumin solution.

The final albumin solution from this third fractionation step is cooled to −5°C. and its methanol content is is adjusted to 50% by volume. The mixture is allowed to stand for 16 hours and then is centrifuged. The precipitate from the 50% methanolic solution is collected and comprises the albumin product of the process of this invention. For ease of storage and handling, the precipitated product is dissolved in 100 ml. of water, adjusted to pH 6.8 with 1 N sodium hydroxide and freeze-dried.

Table I shows the concentrations and recovery of albumin from the various steps of the process.

TABLE I

| | Volume (ml.) | Total mg. albumin | Percent yield |
|---|---|---|---|
| Starting material | 1,000 | 6,100 | |
| Supernatant from the 1st fractionation step | 830 | 3,320 | 54.5 |
| Precipitated solids from the 2nd fractionation step in sodium caprylate solution | 200 | 3,400 | 55.7 |
| Intermediate albumin solution of the 3rd fractionation step | 200 | 3,400 | 55.7 |
| Product suspended in water | 100 | 2,500 | 41.0 |

EXAMPLE 2

The process of Example 1 is followed except that the suspension produced in the first fractionation step is initially filtered through a D-2 filter pad. The precipitate from the first fractionation step contains the bulk of the hemoglobin and globulin in the starting material. The percentage yields achieved in each step of the process of this example are similar to those achieved in Example 1.

The invention in its broader aspects is not limited to the specific details shown and described, but departures may be made from such details within the scope of the accompanying claims without departing from the princi-ples of the invention and without sacrificing its chief advantages.

It is to be understood that although methanol has been indicated hereinabove as the preferred alcohol useful in the various fractionation steps constituting the process of the present invention, the present invention may be carried out with equal facility with ethanol and consequently the use of either of these materials in encompassed by the appended claims and supporting disclosure.

What is claimed is:

1. A process for recovering albumin from a starting methanolic or ethanolic solution of aqueous saline placental extract from which a major portion of the beta and gamma globulins have been eliminated, which comprises:
   (a) a first fractionation step which comprises separating an albumin-containing supernatant solution from solids precipitated by (1) adding to the methanolic or ethanolic placental extract solution a sufficient amount of water-soluble caprylate salt to make said solution 0.01 to 0.05 molar with respect to caprylate ions, (2) adjusting the pH of the resulting solution to 4.7 to 6.0, (3) cooling the solution to 0 to 20° C., and (4) accumulating a precipitate of waste solids;
   (b) a second fractionation step which comprises separating albumin-containing solids from the albumin-containing supernatant solution produced in the first fractionation step by adding a sufficient amount of methanol or ethanol to said albumin-containing supernatant solution to cause precipitation of substantially all of the albumin in said supernatant;
   (c) a third fractionation step which comprises separating impurities from the precipitated albumin of the second fractionation step by dissolving said precipitated albumin in water at a pH of about 1 to 3, agitating the resulting mixture to insure dissolution of the albumin, adding bentonite (colloidal hydrated aluminum silicate) to a concentration of 0.5% centrifuging and filtering the mixture to recover a filtrate containing fluid albumin, adjusting the albumin-containing filtrate to a pH of 4.7 to 5, and
   (d) a final separation step which comprises increasing the methanol or ethanol concentration of the final filtrate of the third fractionation step to precipitate albumin from said final filtrate, and separating a precipitated, purified albumin product from said final filtrate.

2. The process of claim 1 in which the caprylate salt used in the first fractionation step is sodium caprylate.

3. The process of claim 1 wherein during the first fractionation step, the methanolic or ethanolic solution of placental extract is maintained at a temperature of 10 to 25° C. while the water-soluble caprylate salt is added thereto; wherein during the second fractionation step the concentration of methanol or ethanol is increased to about 40 to 50% by volume and the solution is maintained at temperatures of about −5 to −8° C. to accumulate a precipitate of albumin solids; wherein during the third fractionation step the mixture of precipitated albumin, water and bentonite is agitated for from 2 to 4 hours at 0 to 5° C.; and wherein during the final separation step the methanol or ethanol concentration of the final filtrate is increased to about 40 to 50% by volume.

4. The process of claim 3 wherein during the third fractionation step, the precipitated albumin is dissolved in water at a pH of about 1 to 3.

5. The process of claim 3 wherein sufficient methanol, or ethanol is added to the albumin-containing supernatant solution in the second fractionation step to produce a concentration in said supernatant solution of about 50% by volume.

6. The process of claim 3 wherein the waste solids are precipitated in the first fractionation step by: adding sufficient sodium caprylate to the starting solution of placental extract to render said solution about 0.025 molar with respect to caprylate ions, adjusting the pH of the resulting solution to about 4.8, agitating the solution at 20 to 25° C. for 15 to 20 minutes, and then allowing the solution to stand at about 0 to 5° C. until the desired precipitate of waste solids is accumulated.

7. The process of claim 6 wherein sufficient methanol or ethanol is added to the albumin-containing supernatant in the second fractionation step to achieve a 50% by volume concentration in the supernatant.

8. The process of claim 7 wherein the albumin-containing precipitate of the second fractionation step is dissolved in water at a pH of about 2 to 3 in the third fractionation step.

References Cited

UNITED STATES PATENTS

| | | | |
|---|---|---|---|
| 1,989,993 | 2/1935 | Lautenschlager et al. | 424—105 |
| 2,705,230 | 3/1955 | Reid | 260—122 |
| 3,073,747 | 1/1963 | Reid | 424—92 |
| 3,409,605 | 11/1968 | Florini | 260—112 |
| 2,923,665 | 2/1960 | Hagan et al. | 195—66 |
| 2,761,810 | 9/1956 | Singher et al. | 424—11 |

OTHER REFERENCES

Encyclopedia of Chemical Technology, vol. 3, 1964, pp. 567–598, Kirk.

Journal of American Chemical Society, vol. 78, 1956, pp. 1353–1355.

WILLIAM H. SHORT, Primary Examiner

HOWARD SCHAIN, Assistant Examiner

U.S. Cl. X.R.

424—11, 105, 177